(12) United States Patent
Grycewicz

(10) Patent No.: US 8,558,899 B2
(45) Date of Patent: Oct. 15, 2013

(54) SYSTEM AND METHOD FOR SUPER-RESOLUTION DIGITAL TIME DELAY AND INTEGRATE (TDI) IMAGE PROCESSING

(75) Inventor: Thomas J. Grycewicz, Fairfax, VA (US)

(73) Assignee: The Aerospace Corporation, El Segundo, CA (US)

( * ) Notice: Subject to any disclaimer, the term of this patent is extended or adjusted under 35 U.S.C. 154(b) by 818 days.

(21) Appl. No.: 12/619,636

(22) Filed: Nov. 16, 2009

(65) Prior Publication Data

US 2011/0115793 A1    May 19, 2011

(51) Int. Cl.
*H04N 5/228* (2006.01)

(52) U.S. Cl.
USPC ..................................... 348/208.13; 382/260

(58) Field of Classification Search
USPC ....................... 348/164, 36; 345/428; 382/260
See application file for complete search history.

(56) References Cited

U.S. PATENT DOCUMENTS

| | | |
|---|---|---|
| 3,595,995 A | 7/1971 | Hobrough |
| 3,905,045 A | 9/1975 | Nickel et al. |
| 5,220,441 A | 6/1993 | Gerstenberger |
| 5,341,174 A | 8/1994 | Xue et al. |
| 5,696,848 A * | 12/1997 | Patti et al. ..................... 382/254 |
| 5,920,657 A | 7/1999 | Bender et al. |
| 5,946,426 A | 8/1999 | Carlebarch |
| 5,999,211 A | 12/1999 | Hedges et al. |
| 6,023,535 A | 2/2000 | Aoki |
| 6,208,765 B1 | 3/2001 | Bergen |
| 6,320,611 B1 | 11/2001 | Pepin |
| 6,535,650 B1 | 3/2003 | Poulo et al. |
| 7,085,323 B2 | 8/2006 | Hong |
| 7,227,984 B2 | 6/2007 | Cavan |
| 7,352,919 B2 | 4/2008 | Zhou et al. |
| 7,358,474 B2 | 4/2008 | Flynn |
| 7,379,612 B2 | 5/2008 | Milanfar et al. |
| 7,428,324 B2 | 9/2008 | Crandall et al. |
| 7,606,424 B2 | 10/2009 | Rohaly |
| 8,120,683 B1 | 2/2012 | Tumer et al. |
| 8,169,488 B2 * | 5/2012 | Fujiyama ................... 348/208.3 |
| 2005/0057687 A1 * | 3/2005 | Irani et al. ..................... 348/443 |
| 2007/0003165 A1 | 1/2007 | Sibiryakov et al. |
| 2007/0189637 A1 * | 8/2007 | Rohaly ......................... 382/278 |
| 2008/0063294 A1 * | 3/2008 | Burt et al. ..................... 382/255 |
| 2008/0091678 A1 | 4/2008 | Walker et al. |

(Continued)

FOREIGN PATENT DOCUMENTS

WO    WO 2009026522 A1    2/2009

OTHER PUBLICATIONS

O'Neil, E.L., "Transfer Function for an Annular Aperture," *Journal of the Optical Society of America*, vol. 46, No. 4, pp. 285-288 (Apr. 1956).

(Continued)

*Primary Examiner* — Tuan Ho
*Assistant Examiner* — Fayez Bhuiyan
(74) *Attorney, Agent, or Firm* — Henricks, Slavin & Holmes LLP

(57) ABSTRACT

Super-resolution time delay and integrate (TDI) imaging processing and systems for providing same utilize imaging geometry configured such that a predictable sub-pixel component of the frame-to-frame image motion can be used to construct a high-resolution output image from multiple under-sampled low-resolution input images.

53 Claims, 6 Drawing Sheets

(56) References Cited

U.S. PATENT DOCUMENTS

| | | |
|---|---|---|
| 2008/0212838 A1 | 9/2008 | Frigerio |
| 2009/0028423 A1 | 1/2009 | Sandstrom et al. |
| 2009/0148051 A1 | 6/2009 | Pham et al. |
| 2010/0046853 A1* | 2/2010 | Goodnough et al. ......... 382/275 |
| 2011/0293146 A1 | 12/2011 | Grycewicz |
| 2012/0127331 A1 | 5/2012 | Grycewicz |

OTHER PUBLICATIONS

Kim, S.P., et al., "Recursive Reconstruction of High Resolution Image from Noisy Undersampled Multiframes," *IEEE Trans Acoustics, Speech, and Signal Processing*, vol. 38, No. 6, pp. 1013-1027 (Jun. 1990).

Tom, B.C., et al., "Reconstruction of a high resolution image by simultaneous registration, restoration, and interpolation of low-resolution images," *Proceedings of the 1995 International Conference on Image Processing* (Date of Conference: Oct. 23-26, 1995).

Borman, S., et al., "Super-resolution from image sequences—A review," *Proc. 1998 Midwest Symp, Circuits and Systems*, pp. 374-378 (1999).

Hochman, G., et al., "Restoration of images captured by a staggered time delay and integration camera in the presence of mechanical vibrations," *Applied Optics*, vol. 43, No. 22, pp. 4345-4354 (Aug. 1, 2004).

Jacobsen, K., "High-Resolution Imaging Satellite Systems," 3D-Remote Sensing Workshop, Porto (2005), accessed at http://www.ipi.uni-jannover.de/uploads/tx_tkpublikationen/HRIjac.pdf.

Grycewicz, T.J., et al., "Joint transform optical correlation applied to sub-pixel image registration," *Proceedings of the SPIE*, vol. 5908, pp. 59080Z-1-59080Z-9 (Sep. 10, 2005).

Haik, O., et al., "Superresolution reconstruction of a video captured by a vibrated time delay and integration camera," *Journal of Electronic Imaging*, vol. 15(2), pp. 023006-1-023006-12 (Apr.-Jun. 2006, published online May 17, 2006).

Krashefski, B., et al., "A Versatile, Producible, Digital, FPA Architecture," *Proceedings of the SPIE*, vol. 6206, pp. 62062W-1-62062W-12 (May 18, 2006).

Ridgway, G.R., "Longitudinal MR Imaging of Dementia (Nine-month Report)," Centre for Medical Image Computing, University College London (Jun. 29, 2006).

Grycewicz, T.J., et al., Fourier plane and optical proceesing for sub-pixel image registration, *Proceedings of the SPIE*, vol. 6311, pp. 631117-1-631117-8 (Aug. 30, 2006).

Janschek, K., et al., "Performance Analysis for Visual Planetary Landing Navigation using Optical Flow and DEM Matching," *Proceedings of the AIAA Guidance, Navigation and Control Conference 2006*, Keystone, Colorado, Paper No. A1AA-2006-6706 (Date of Conference: Aug. 21-24, 2006).

Pickup, L.C., "Machine Learning in Multi-frame Image Super-resolution," Robotics Research Group, Department of Engineering Science, University of Oxford (2007).

Bodenstorfer. E., et al., "High-speed Line-Scan Camera with Digital Time Delay Integration," *Proceedings of the SPIE*, vol. 6496, pp. 64960I-1-64960I-10 (Feb. 26, 2007).

Grycewicz, T.J., et al., "Estimation bias from using nonlinear Fourier plane correlators for sub-pixel image shift measurement and implications for the binary joint transform correlator," *Proceedings of the SPIE*, vol. 6695, pp. 66950J-1-66950J-11 (Sep. 20, 2007).

Krotosky S.J., et al., "On Color-,Infrared-, and Multimodal-Stereo Approaches to Pedestrian Detection," *IEEE Transactions on Intelligent Transportation Systems*, vol. 8 No. 2, pp. 619-629 (Dec. 2007).

Cota, S.A., et al., "PICASSO—An End-to-End Image Simulation Tool for Space and Airborne Imaging System," *Proceedings of the SPIE*, vol. 7087, pp. 708703-1-708703-31 (Aug. 25, 2008).

* cited by examiner

TDI focal plane layout with offset imaging arrays

◯ = Pixel 1
◉ = Pixel 2
⊘ = Pixel 3
⊖ = Pixel 4

SYSTEM AND METHOD FOR SUPER-RESOLUTION DIGITAL TIME DELAY AND INTEGRATE (TDI) IMAGE PROCESSING

TECHNICAL FIELD

The invention relates generally to image processing and, in particular, to a system and method for constructing a high-resolution output image from multiple under-sampled low-resolution input images captured, for example, by a staring array imager, a time delay and integrate (TDI) imager, or an active-pixel imager.

BACKGROUND ART

Reconstruction of a high-resolution image from a sequence of lower resolution images is a way to increase the effective spatial resolution of a camera capturing conventional movie images (see, e.g.: Huang, T. S. and Tsai, R. Y., "Multi-frame image restoration and registration," Advances in Computer and Image Processing, Vol. 1, (1984); Kim, S. P., Bose, N. K., and Valenzuela, H. M., "Recursive Reconstruction of High Resolution Image From Noisy Undersampled Multiframes," IEEE Trans Acoustics, Speech, and Signal Processing 38 (6), 1990; Tom, B. C., Katsaggelos, A. K., "Reconstruction of a high resolution image by simultaneous registration, restoration, and interpolation of low-resolution images," Image Processing, 1995, Proceedings, International Conference on (1995); Schultz, R. R. and Stevenson, R. L., "Extraction of High-Resolution Frames from Video Sequences," IEEE Trans. Signal Processing 5(6), 1996; Borman, S. and Stevenson, R. L., "Super-resolution from image sequences—A review," in Proc. 1998 Midwest Symp. Circuits and Systems, 1999, pp. 374-378; and Alam, M. S., Bognar, J. G., Hardie, R. C., and Yasuda, B. J., "Infrared Image Registration and High-Resolution Reconstruction Using Multiple Translationally Shifted Aliased Video Frames," IEEE Trans. Instrumentation and Measurement, Vol. 49, No. 5 (2000)) and for cases where the focal plane for a still image is translated through a deterministic (or random) motion during the capture of a series of image captures (see, e.g.: Hochman, G., Yitzhaky, Y. Kopeika, N. S., Lauber, Y., Citroen, M., and Stern, A., "Restoration of Images Captured by a Staggered Time Delay and Integration Camera in the Presence of Mechanical Vibrations," Applied Optics Vol. 43 No. 22, P. 4345-4354 (2004); and Haik, O. and Yitzhaky, Y., "Superesolution reconstruction of a video captured by a translational vibrated staggered TDI camera," Proc. SPIE, 5558 (2004)).

NASA's Drizzle algorithm applies super-resolution techniques to reconstruct images taken with the wide-field cameras on the Hubble Space Telescope. See, e.g., Fruchter, S. A. and Hook, R. N., "Drizzle: A Method for the Linear Reconstruction of Undersampled Images," PASP 114:144-152 (2002). See also: U.S. Pat. No. 5,341,174 to Xue et al., entitled "Motion Compensated Resolution Conversion System"; U.S. Pat. No. 5,696,848 to Patti et al., entitled "System for Creating a High Resolution Image from a Sequence of Lower Resolution Motion Images"; U.S. Pat. No. 5,920,657 to Bender et al., entitled "Method of Creating a High Resolution Still Image Using a Plurality of Images and Apparatus for Practice of the Method"; U.S. Pat. No. 5,946,426 to Carlebarch, entitled "Efficient Upward Raster Conversion Of Rotated Images"; U.S. Pat. No. 6,023,535 to Aoki, entitled "Methods and Systems for Reproducing a High-Resolution Image from Sample Data"; U.S. Pat. No. 6,208,765 B1 to Bergen, entitled "Method and Apparatus for Improving Image Resolution"; U.S. Pat. No. 6,535,650 B1 to Poulo et al., entitled "Creating High Resolution Images"; U.S. Pat. No. 7,085,323 B2 to Hong, entitled "Enhanced Resolution Video Construction Method and Apparatus"; and U.S. Pat. No. 7,352,919 B2 to Zhou et al., entitled "Method and System of Generating a High-Resolution Image from a Set of Low-Resolution Images".

Super-resolution reconstruction has been used with line scan and TDI imagers where the focal plane consists of two imaging arrays with a sub-pixel offset between the pixel locations in one array and the locations in the other, as shown in FIG. 1. See, U.S. Pat. No. 7,227,984 B2 to Cavan, entitled "Method and Apparatus for Identifying the Defects in a Substrate Surface by using Dithering to Reconstruct Under-Sampled Images"; Grycewicz, T. J., Cota, S. A., Lomheim, T. S., and Kalman, L. S., "Focal plane resolution and overlapped array TDI imaging," Proc. SPIE 708703 (2008). The overlapped array scheme has been implemented for the 2.5 m GSD "supermode" on the ESA SPOT-5 imaging satellite. See, Jacobsen, K., "High-Resolution Imaging Satellite Systems," 3D-Remote Sensing Workshop, Porto (2005), accessed at http://www.ipi.uni-hannover.de/uploads/tx_tk-publikationen/HRIjac.pdf; and Poon, J., Smith, L., and Fraser, C., *Orthoimage Resolution and Quality Standards, Project Number 2.3 Final Report*, CRC for Spatial Information, University of Melbourne (2006).

Visible light imagers generally use a CCD array specifically designed for TDI imaging. In conventional TDI processing, the image motion across the array must be parallel to the array columns in order to avoid image smear. Likewise, the image motion across the array must be precisely locked to the array line rate to avoid smear. See also, Bodenstorfer, E., Fürtler, J., Brodersen, J., Mayer, K. J., Eckel, C., Gravogl, K., Nachtnebel, H., "High-speed Line-Scan Camera with Digital Time Delay Integration," Proc. SPIE, 649601 (2007).

It would be useful to be able to improve the resolution achieved by a digital TDI camera. It would be useful to remove the constraint of precise synchronization of image motion and FPA timing required by conventional TDI, which would allow relaxation of the pointing and control requirements normally associated with a TDI camera. It would be useful to be able to reduce the blur caused by image drift in a TDI camera. It would be useful to be able to use a conventional video camera as a low-speed TDI imager, extending utility of the video camera for low-light imaging. It would also be useful to be able to use a conventional color video camera as a TDI imager to improve resolution and extend the image amplitude resolution and sensitivity at each pixel.

SUMMARY OF THE INVENTION

Techniques described herein enable a conventional area array imager to be operated as a super-resolution time delay and integrate (TDI) sensor. In an example embodiment, a modification to conventional TDI imaging, which provided increased resolution involves the super-resolution processing utilized in conjunction with a high-speed area array.

In conventional TDI processing, the image motion across the array must be parallel to the array columns in order to avoid image smear. Likewise, the image motion across the array must be precisely locked to the array line rate to avoid smear. According to example embodiments described herein, image drift is deliberately introduced in both dimensions and output data is sent to a super-resolution processing algorithm, which uses this drift to produce an image with up to twice the effective resolution possible with a conventional TDI imager.

The imaging geometry is set up such that a predictable sub-pixel component of the frame-to-frame image motion can be used to construct a high-resolution output image from multiple under-sampled low-resolution input images. This combines the benefits of TDI imaging with the benefits of super-resolution processing.

In an example embodiment, the TDI focal plane is rotated from its normal orientation perpendicular to the scan direction. This produces a predictable cross-scan drift. The line rate is set to produce an in-scan drift. During image collection a sequence of images is saved and the images are combined on a high-resolution synthetic image plane (e.g., using techniques developed for reconstruction of a high-resolution image from sequences of low-resolution images). When the image drifts are accurately known and easily controlled, image processing is easily and efficiently implemented, and the only additional resource required in the processing chain is more memory. Alternately, if the drift rates are not known a priori, or are not easily controlled, the image drift can be estimated for each sub-image, and the image reconstruction can be carried out as a post-processing step.

In an example embodiment, an imaging system includes: an imaging device configured to capture a sequence of input images of a scene as a field of regard of the imaging device changes in position in relation to the scene pursuant to an imaging geometry; and a processor configured to utilize the imaging geometry to determine a sub-pixel component of frame-to-frame image motion and to use the sub-pixel component to construct a high-resolution output image from the input images.

In an example embodiment, an imaging method includes: utilizing a camera (or other imaging device) to capture a sequence of input images of a scene in a camera grid such that the scene is rotated in relation to the camera grid and frame-to-frame motion is introduced along the sequence of images; computing image motion with respect to a reference frame for a high-resolution output image; reformatting the input images to the resolution of the high-resolution output image, translated to compensate for frame-to-frame motion; and forming the high-resolution output image by processing the valid contributions from each sub-image or image of the camera grid at every pixel of the camera.

DISCLOSURE OF INVENTION

A "sub-frame" is defined as one of a sequence of images which will be used to reconstruct a super-resolution image. A "pixel grid" is defined as a map of the center of each pixel in the imaging device (e.g., focal plane array (FPA)), and an "image grid" is defined as a two-dimensional projection of these points onto the surface being imaged for a particular sub-frame.

Figure 1:
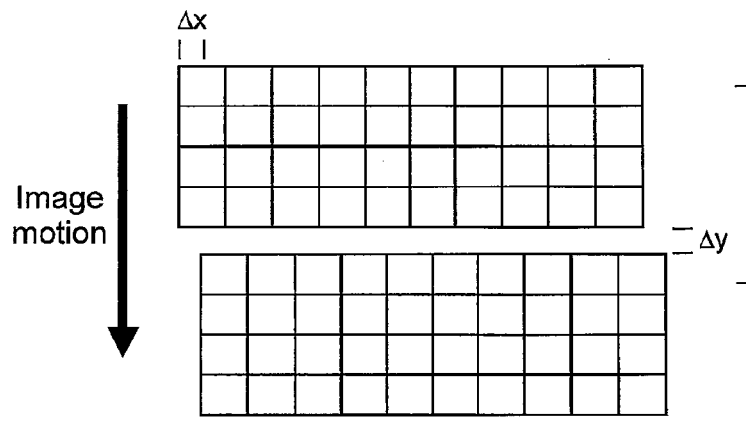
FIG. 1 illustrates a TDI focal plane layout with offset imaging arrays.
Figure 2A:
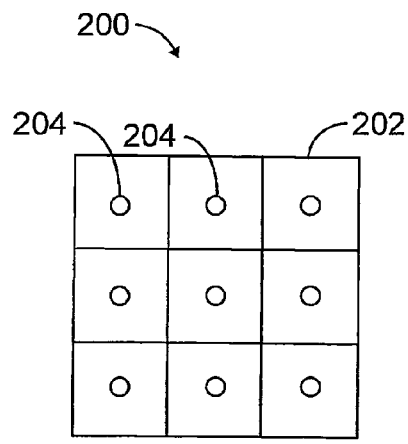
FIG. 2A shows a representation of an example of a camera pixel sub-frame.

FIG. 2A shows a representation of an example of a camera pixel sub-frame 200, namely, an image grid 202 of the center locations 204 of the camera pixels for a sub-frame. The camera pixels that define an input image are captured at a focal plane of the camera (or other imaging device).

Figure 2B:
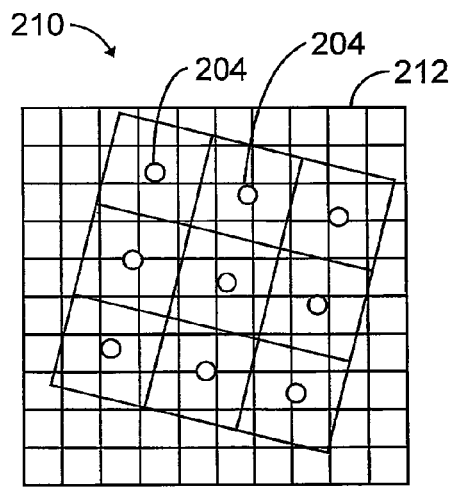
FIG. 2B shows a representation of an example of a high-resolution output image reference frame.

FIG. 2B shows a representation of an example of a high-resolution output image reference frame 210, namely, an output grid 212 with the center locations 204 of the camera pixels projected thereon. To facilitate the super-resolution processing, in this example embodiment, the output grid 212 (for the output image) has a higher resolution than the image grid 202 (for the input images) and is rotated in relation to the latter. For example, the respective columns of the image grid 202 and the output grid 212 form an angle that can range between 0° and 90°. The output image is reconstructed on a high-resolution image plane (or high-resolution synthetic image plane).

Conventional TDI systems utilize motion of the image in relation to the focal plane wherein the image is repositioned across the focal plane in perfect lock-step with the TDI reconstruction process. Every time the image moves through one pixel, a sub-frame is captured. The output is reconstructed on an output grid with the same resolution as the FPA. After each sub-frame capture, the output grid is shifted by one pixel and the new sub-frame is added to the previous collects, building up a long effective integration time. Any deviation in the image motion from the prescribed 1.0 pixels per sub-frame results in an undesirable image smear. For example, if a conventional TDI system has a 5 percent image drift, or an image drift of one twentieth of a pixel per frame and integrates for 64 frames, the resultant output image has 3.2 pixels of smear. In the disclosed invention, smear is limited to the smear incurred through image motion during one sub-frame.

In an example embodiment, the super-resolution image reconstruction process projects the measured image grid values onto a high-resolution output grid. In order for super-resolution processing to be useful for reconstructing a TDI image on an image grid with resolution greater than the resolution of the focal plane, there must be a sub-pixel shift on the image grid between one sub-frame to the next. In an example embodiment, this sort of motion is deliberately introduced, for example, image drifts along both the in-scan and cross-scan directions.

In one example geometry, the cross-scan drift can be accomplished by introducing camera motion in the cross-scan direction. In-scan drift can be accomplished by deliberately introducing a mismatch between focal plane timing and image motion. By way of example, the scan direction is defined as the direction parallel to the FPA columns. This first construct is suitable for applications such as satellite imaging, where the camera is moving and the scene is stationary. In another example geometry, a drift in both in-scan and cross-scan directions can be introduced by rotating the focal plane with respect to the scan direction. The focal plane timing can then be used to fine-tune the in-scan drift velocity. By way of example, the scan direction is defined as parallel to the image motion across the FPA. This second construct is useful in scenarios such as imaging moving parts on an assembly line, where the camera is stationary and the scene is moving. The two geometries can be shown to be essentially identical with a change of coordinates.

Figure 3A:
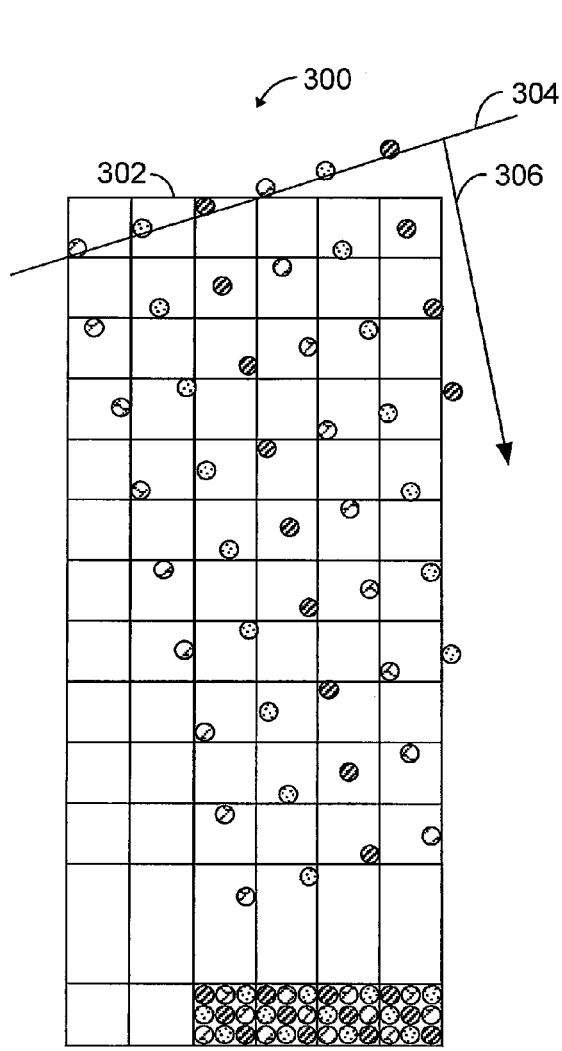
FIG. 3A is a visualization of a synthetic TDI array showing the camera orientation rotated with respect to the image motion, and illustrating, as represented by the stacking of dots at the bottom, nine camera frames used to build a super-resolution output with nine pixels corresponding to each camera pixel.

FIG. 3A illustrates an example visualization of a synthetic TDI array 300 showing image motion rotated with respect to the camera grid 302. The line (denoted 304) through the row of dots and the arrow (denoted 306) assist in visualizing the motion of the scene being imaged with respect to the camera pixels, which are shown as a square grid (the camera grid 302). In this example visualization, each point in the scene moves 1.333 pixels vertically and 0.333 pixels horizontally between frames. After nine sub-frames a 3×3 grid is populated. The visualization shown in FIG. 3A is but one of many possible rotated geometries contemplated as being within the scope of the present invention.

Figure 3B:
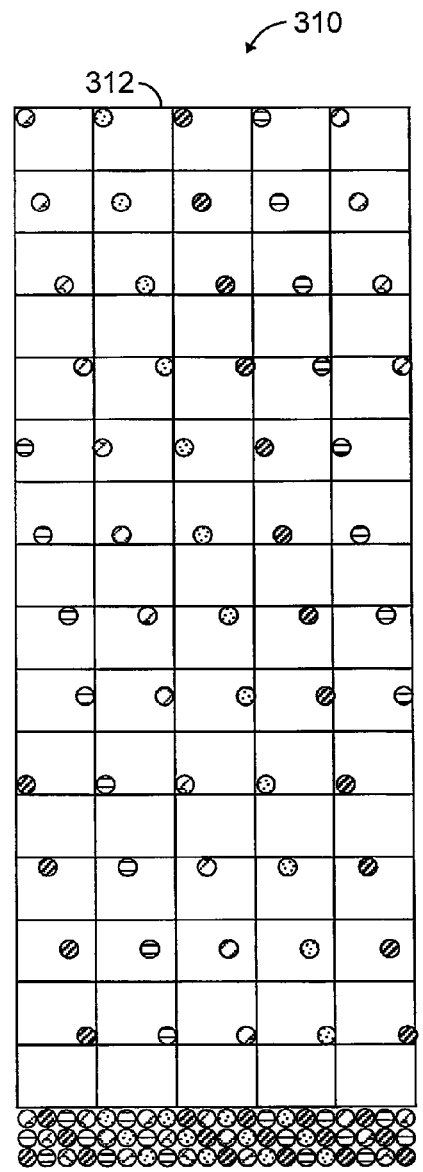
FIG. 3B is a visualization of a synthetic TDI array showing image motion in both the x and y dimensions and illustrating, for twelve camera frames, as represented by the stacking of dots at the bottom, how the camera frames are binned to form a high-resolution output image.

FIG. 3B illustrates an example visualization of a synthetic TDI array 310 with the input image pixels aligned to the image axes of the camera frame, but with image motion in both the x and y directions and showing, for twelve camera frames, as represented by the stacking of dots at the bottom of the camera grid 312, how the camera frames are binned to form a high-resolution output image. The visualization shows the frame-to-frame drift of the image grid across the output grid for a geometry in which the scan direction is considered to be the direction parallel to the array columns and drift is introduced in both the in-scan and cross-scan directions. In this example, the in-scan image rate is 1.333 pixels per sub-frame for a drift rate of 0.333 pixels and the cross-scan drift is 0.25 pixels per sub-frame. After 12 sub-images, a 4×3 super-resolution grid for each pixel is fully populated.

In an example embodiment, the goal is to populate a super-resolution grid with one sample per sub-pixel over some small number of sub-frame captures. This arrangement has the advantage that reconstructing the image is simply accomplished by writing the input pixel values to a high-resolution grid in the proper order. If desired, a convolution filter can then be used to sharpen or otherwise condition the output image.

Figure 4:
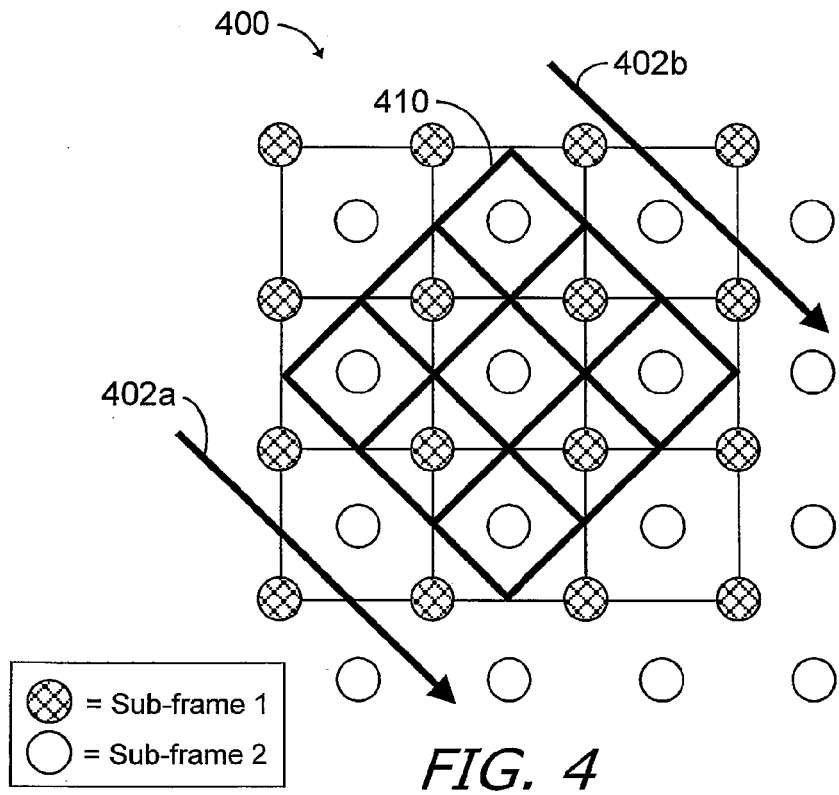
FIG. 4 depicts an example embodiment where the camera array is oriented at 45° in relation to the motion of the scene, and the frame rate is timed so that the image moves one pixel diagonally across the camera in two frames.

FIG. 4 depicts an example embodiment where the camera array (or camera grid) 400 is oriented at 45° in relation to the motion of the scene (directionally indicated by arrows 402a and 402b), and the frame rate is timed so that the image moves 0.707 pixel diagonally across the camera each frame. This diagonal image drift results in each pixel location falling in the center of the square made by the pixels of the previous frame. The cross-hatched dots connected by thin grid lines of the camera grid 400 show the centers of the camera pixels during one frame, and the white dots correspond to the pixel centers in the following frame. The arrows 402a and 402b show the motion of the image with respect to the camera pixels. The thick grid lines show the high-resolution output pixel grid 410. In this example embodiment, the high-resolution grid 410 is rotated 45° with respect to the camera grid 400 and the pixel spacing is reduced by a factor of 0.707. This geometry is advantageous in that it is relatively easy to set up, makes efficient use of computer memory and computation, and provides a useful resolution enhancement.

Figure 5:
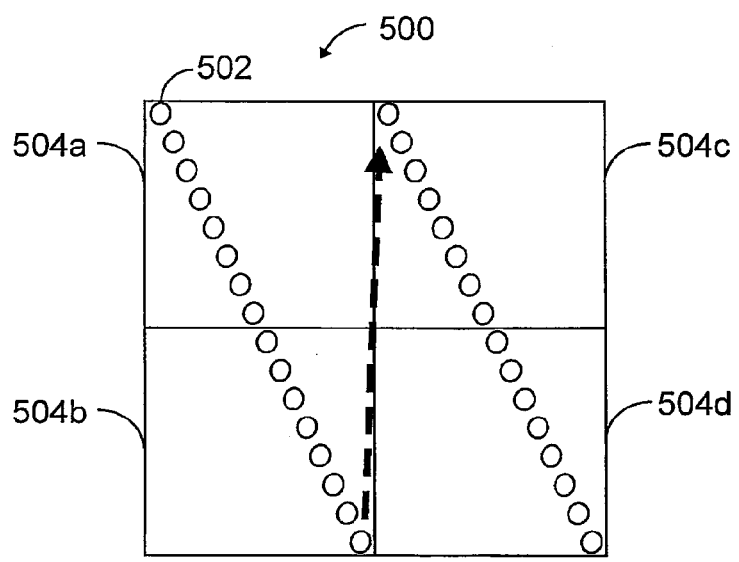
FIG. 5 illustrates an example of the relative location of an image pixel drifting with respect to a camera pixel during image capture, for drifts of 1/32 pixel cross-scan and 1/16 pixel in-scan, and provides a visualization of how the pixel values can be binned by quadrant to improve resolution and reduce image smear.

It is generally not the case that the camera pixels will fill into a high-resolution grid at one sample per grid-point. For instance, in a case where the standard TDI mode is 32 captures, the drifts introduced might be 1/32 pixel cross-scan and 1/16 pixel in-scan (an in-scan motion of 15/16 or 17/16 pixel). In a configuration where the desired output resolution is twice the camera resolution, these could be summed on an output grid with twice the resolution of the focal plane array. Eight of the 32 measurements would contribute to each output pixel. By way of example, FIG. 5 illustrates the relative location of an image pixel center 502 drifting with respect to a camera pixel 500 during image capture, for drifts of 1/32 pixel cross-scan and 1/16 pixel in-scan, and provides a visualization of how the pixel values can be binned by quadrant (quadrants 504a, 504b, 504c and 504d, as denoted here) to improve resolution and reduce image smear. For example, the actual camera motion may be 1/32 pixel or 33/32 pixel cross-scan and likewise 1/16 or 17/16 pixel in-scan.

In this example embodiment, the output pixels sum sub-frames where the pixel center falls in the corresponding image grid pixels (a sampling resolution increase of 2 in both dimensions). For the situation illustrated in FIG. 5, the x and y image drift rate need not be related by a factor of two, as shown here. However, it is desirable that the x and y drift rates not be the same, or all of the center locations would fall in the upper right and lower left quadrants, and none in the other two quadrants. The relative rates of in-scan and cross-scan drift should be set to evenly populate the output pixels. If the output has, for example, sixteen pixels for each focal plane pixel (a 4×4 resolution increase), the drift rates should be chosen such that at least one sub-frame measurement is expected to contribute to each of the 16 output pixels.

In general, each output pixel may not be supported by the same number of data measurements. This is particularly true if the super-resolution image is reconstructed after-the-fact by analyzing image drift induced by a combination of intentional motion and random jitter. In an example embodiment, when reconstructing the output, the value at each output pixel can be normalized through dividing by the number of measurements summed at that pixel. Output pixels that are not supported by any measurements can be approximated by interpolating between neighboring values.

The super-resolution TDI described herein differs from conventional TDI processing, in that the exact drift rates do not need to be determined in advance if it is possible to capture the entire data stream for post-processing. In such circumstances, image registration can be used to estimate the drift of the image grid from one frame to the next, and this drift information used to reconstruct the output grid. Noise in the sub-frame to sub-frame motion estimates can be countered by using techniques from detection and estimation theory, such as application of a Kalman filter to track image motion. See, S. Erturk, "Real-Time Digital Image Stabilization Using Kalman Filters," *Real-Time Imaging* 8, 317-328 (2002), incorporated herein by reference.

Figure 6:
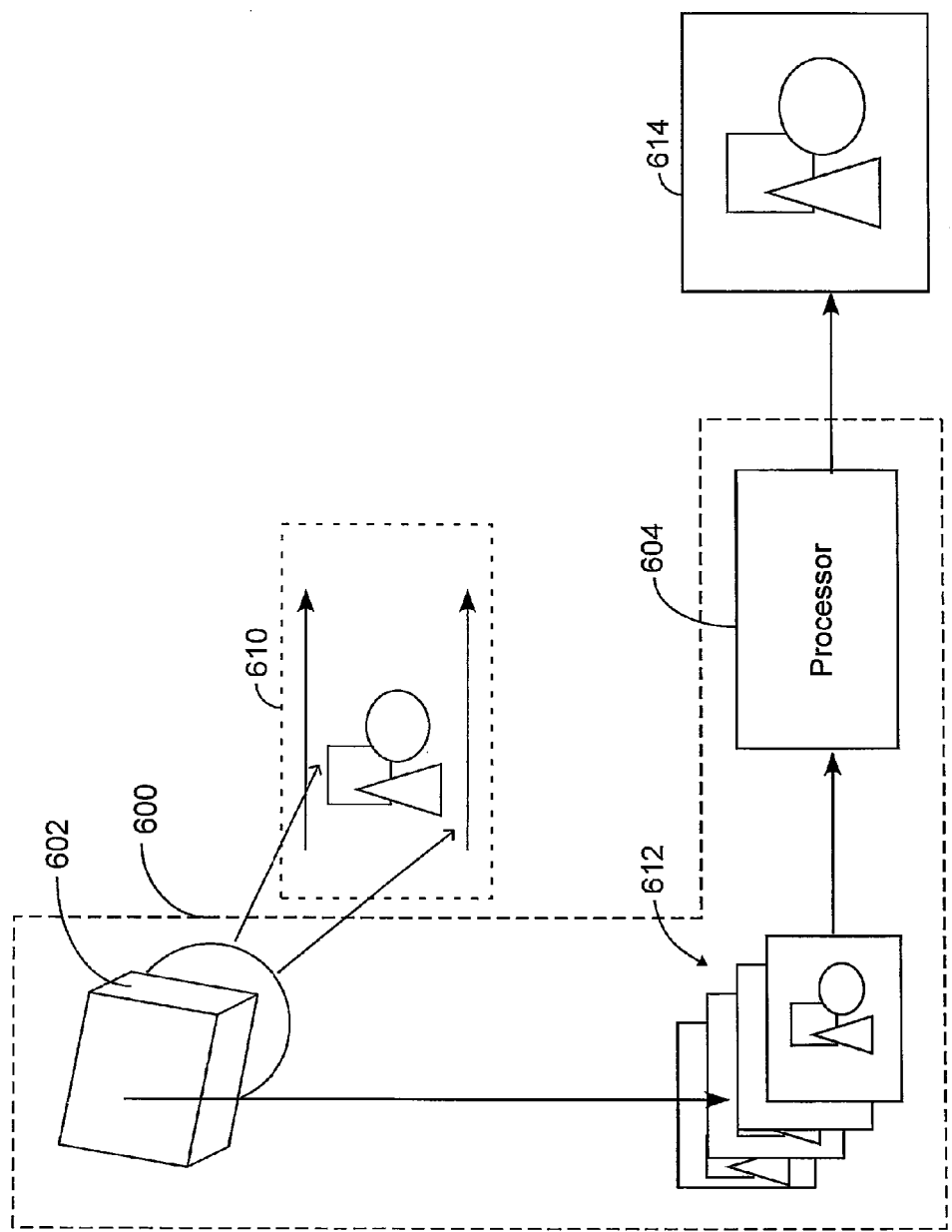
FIG. 6 is a block diagram showing an example embodiment of a digital synthetic super-resolution TDI imager system.

Referring to FIG. 6, in an example embodiment, a digital synthetic super-resolution TDI imager system 600 (denoted in dashed lines) includes an imaging device 602 that is operative interconnected to a processor (or other computing device) 604. In an example embodiment, the imaging device 602 is a sensor that is responsive to electromagnetic radiation in the visible, infrared, millimeter wave, terahertz, ultraviolet, x-ray, or gamma ray region of the spectrum. The imaging device 602 can be a staring array imager and, for example, include a focal plane array (FPA). The imaging device 602 can be a charge-coupled device (CCD) array, an active-pixel imager, or a Complementary Metal-Oxide-Semiconductor (CMOS) array.

In an example embodiment, an imaging device 602 (such as a high-speed camera sub-system including a fast-framing staring array focal plane) is used as a TDI imager with the TDI imaging geometry optimized as an input to a processor (or other computing device) 604 programmed to perform the super-resolution image reconstruction process. The processor 604 can also be programmed to implement other and/or additional processing tasks including, but not limited to, the convolution filtering and Kalman filtering described herein. The processor 604 includes and/or has access to a memory device for storing data.

Referring again to FIG. 6, a scene 610 (denoted in dashed lines) to be imaged is shown in motion relative to the imaging device 602. In an example embodiment, the imaging device 602 is mounted such that the rows in the focal plane form an angle other than parallel or perpendicular to the direction of image motion. Whereas in a conventional TDI imager the camera timing would be synchronized such that the image moves by exactly one pixel per frame, in an example embodiment of the super-resolution TDI imager described herein the timing is set such that the image traverses an non-integral number of pixels between image frames. If the high-speed camera has a narrow dimension (as in a 512×64 focal plane), the narrow dimension will usually be aligned to be nearly perpendicular to the image motion. An advantage can be gained by choosing the angle between the image motion and the camera columns such that the image motion causes a point in the image to transit a single pixel in the column direction while transiting the active rows of the focal plane array (this assumes long rows/short columns). Alternatively, as previously discussed, image drifts along both the in-scan and cross-scan directions can be introduced via other geometries.

Images 612 captured by the imaging device 602 (in the form of image data) are provided to the processor 604 as depicted. In an example embodiment, a high-speed, low-spatial resolution, (and possibly) low-amplitude resolution movie is captured by the imaging device 602.

In an example embodiment, the processor 604 is programmed to combine the images 612 by compensating for the image motion and summing on a high-resolution image grid as described herein. The resulting output image 614 will have higher spatial resolution than the input images 612, and (depending on system parameters) may also have better amplitude-resolution and signal-to-noise ratio (SNR).

Additionally, the super-resolution and other processing techniques described in the references referred to in the section entitled "Background Art", all of which are incorporated herein by reference, can be implemented as appropriate in providing software programs, modules, etc. to be executed by the processor 604. It should also be appreciated that the processing functionality provided by the processor 604 can be distributed among multiple computing devices and/or provided at least in part via a remote communications link. Other computing configurations can also be implemented.

Figure 7:
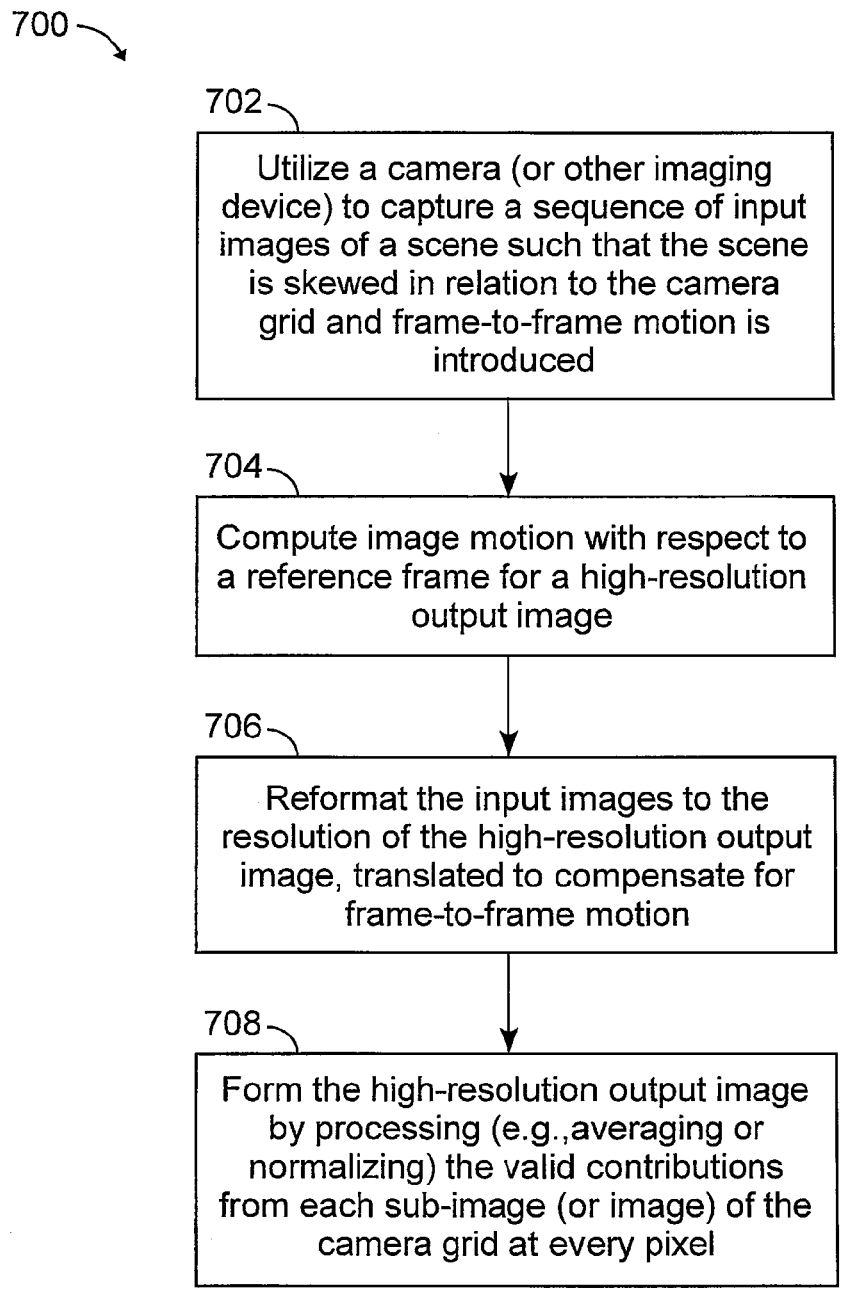
FIG. 7 is a flow diagram showing an example embodiment of a method for digitally reconstructing an oversampled synthetic TDI image.

FIG. 7 is a flow diagram showing an example embodiment of a method 700 for digitally reconstructing an oversampled synthetic TDI image. At step 702, a camera (or other imaging device) is utilized to capture a sequence of input images of a scene such that the scene is rotated in relation to the camera grid and frame-to-frame motion is introduced. At step 704, image motion is computed with respect to a reference frame for a high-resolution output image. At step 706, the input images are reformatted to the resolution of the high-resolution output image, translated to compensate for frame-to-frame motion. At step 708, the high-resolution output image is formed by processing (e.g., averaging or normalizing) the valid contributions from each sub-image (or image) of the camera grid at every pixel.

In order to construct a high-resolution output image from a sequence of digitally captured TDI frames, as a preliminary step, a high-resolution image grid is constructed on which to collect the data. The high-resolution image grid is stored in computer memory (e.g., in the memory device included in and/or accessible to the processor 604). The high-resolution image grid has a higher resolution than the input images, and may have higher resolution than the output image. In some implementations, the synthetic TDI images may be collected on an intermediate image grid with resolution much higher than the output image. The pixels in this intermediate image grid would then be aggregated to form the output image.

For each sub-frame captured, pixels in the camera frame are assigned to pixels in the high-resolution frame where the center of the high-resolution pixel most closely represents the same image location as the center of the camera pixel. As a series of camera pixels is captured, the intensity values are placed in the corresponding pixels of the high-resolution grid. When a later frame maps to the same pixels as an earlier frame, the high-resolution values may be summed (increasing amplitude resolution), or the earlier value may simply be replaced. If multiple values are summed, and when the number of values summed at all pixels may not be the same, the system must keep track of the number of summed values so that the final pixel values can be normalized.

When more camera pixels are captured than needed to fill a high resolution grid, as is the case in FIG. 5, the camera values can be summed to improve the amplitude resolution. Unless the number of samples contributing to each high-resolution pixel is the same, the values should be normalized or averaged so that each pixel value is proportional to the average camera value at the pixel. Averaging is done by dividing each pixel by the number of contributing frames. This is done by multiplying each pixel by a value that will result in all pixels carrying the same weight. A normalization factor that will bring a pixel to a common weighting is the least common denominator of the nonzero sample counts divided by the count at that pixel. (In many cases normalization will be computationally more efficient. This normalization process always results in multiplication by a small integer, which is computationally much simpler than floating point division, and can be easily implemented on a Field Programmable Gate Array.) After image collection is complete, any high-resolution pixel values that have not received a value are considered invalid entries in the high-resolution image. Their value (still zero at this point) should be replaced with an interpolated value calculated from neighboring pixels. If the neighboring pixels are not all based on the same number of frames, normalization must be done before interpolation.

With regard to noise considerations, the super-resolution TDI processing described here combines the SNR advantages gained through the TDI process with advantages gained through the super-resolution reconstruction process. TDI increases the effective integration time for an image, reducing the effect of Shot noise on the SNR by the square root of the number of TDI stages. (With digital TDI, the effect of read noise is increased by the square root of the number of TDI stages, so efforts must be taken to minimize read noise.)

With super-resolution processing, the detector pixels are generally larger than the pixel pitch of the output image. A SNR gain is realized by using larger pixels (the same as through pixel aggregation), but without the associated reduction in output resolution. If one doubles the size of a pixel in both x and y directions, the signal is increased by a factor of four and the Shot noise is increased by a factor of two (again, the square root relationship). Hence, the signal-to-noise ratio is improved by a factor of two. Of course, it takes four sub-images to build the image with the higher resolution.

In considering, by way of example, a Shot-noise-limited super-resolution imager with an output pitch of half the input pitch operated in a mode with a total integration of sixteen stages, with four sub-images contributing to each output pixel, the high resolution output sums the contributions to each output pixel. The output SNR will benefit by a factor of two from the four TDI samples integrated in the pixel and by a factor of two from the pixel area relationship, for a combined SNR increase by a factor of four. (This increase is compared to the case of a single snapshot using a focal plane where the pixels are sized at the output pitch.) Because each output value is the sum of four reads, it should contain twice the RMS read noise of a single measurement.

The super-resolution TDI processing techniques described herein can be extended to color cameras by recognizing that in which, for example, the color image from the focal plane array is an interlaced set of filtered images. To form the high-resolution output image, a high-resolution output grid is formed with one pixel plane for each color. Each output pixel plane is populated from the pixels in its color in the same way as described for the output array in a monochrome process. In an example embodiment, the imaging device 602 is a color camera with sensor input pixels and a filter array positioned in front of the sensor input pixels. The techniques described herein can be implemented using a filter array with a spatially repeating filter pattern (e.g., a repeating color filter pattern). In an example embodiment, each set of pixels in a particular color is treated as a sparse input array, i.e., the output of the filter array includes one value for each of the sensor input pixels for each filter mask type or filter color of the filter array. The filter array can be implemented in the form of a Bayer pattern color mask, a multispectral color mask, a polarization (or polarimetric) mask, as well as other types of masks.

Figure 8B:
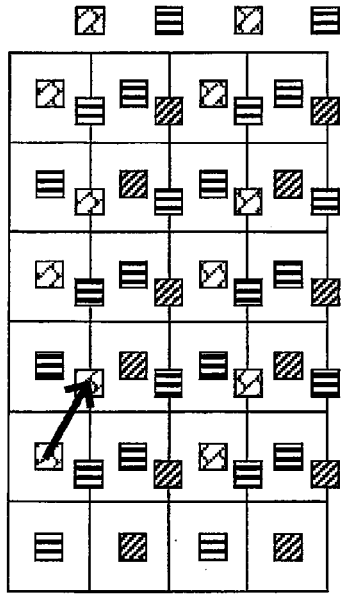
FIG. 8B shows an example TDI shift pattern in which the image moves by 5/6 pixel horizontally and 1/2 pixel vertically between frames.
Figure 8D:
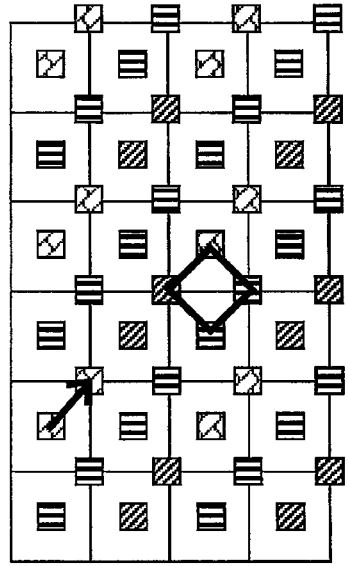
FIG. 8D shows an example TDI shift pattern in which the image moves by 1/2 pixel horizontally and 1/2 pixel vertically between frames.
Figure 8A:
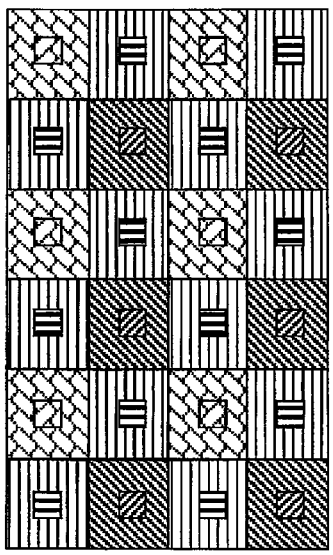
FIG. 8A shows the conventional Bayer color mask, with one red, two green, and one blue filter for each block of four pixels.

Referring to FIG. 8A, in an example embodiment where the color image is measured with a Bayer pattern filter, each block of four pixels is made up of one red, two green, and one blue pixel. Various TDI shift patterns can be employed according to the principles described herein.

FIG. 8B shows an example TDI shift pattern in which the image moves by 5/6 pixel horizontally and 1/2 pixel vertically between frames. The shift pattern repeats after 12 frames and results in fairly good population of the high-resolution output grid.

Figure 8C:
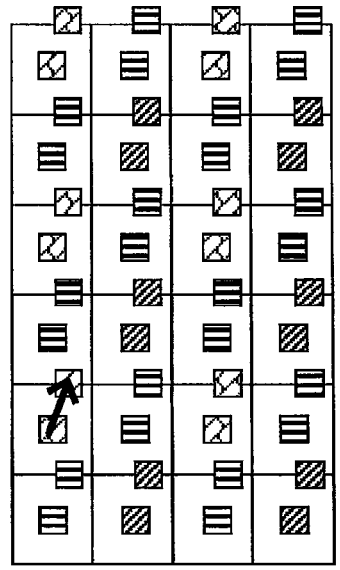
FIG. 8C shows an example TDI shift pattern in which the image moves by 1/2 pixel horizontally and 1/6 pixel vertically between frames.

FIG. 8C shows an example TDI shift pattern in which the image moves by 1/2 pixel horizontally and 1/6 pixel vertically between frames. The shift pattern repeats after 12 frames and results in fairly good population of the high-resolution output grid.

FIG. 8D shows an example TDI shift pattern in which the image moves by 1/2 pixel horizontally and 1/2 pixel vertically between frames. The shift pattern repeats on every fourth input. This is the color analog to the previously-described diagonal shift case for a panchromatic array. The output grid can be built at a 45° angle to the input grid as shown by the box in the figure. The length of the sides of this new unit cell are shorter than the original sides by the square root of two, and its area is half the original pixel area. After four input images are summed, each green pixel will be the sum of four green input pixels, and each red/blue pixel will be the sum of two red and two blue pixels. Because red/blue and green are not summed at the same locations, a factor of two reduction memory use can be realized. This is because a full set of pixel values (red, green, and blue) is representative of the values stored in a pair of pixels. In order to assign red, green, and blue values at each pixel, green values must be interpolated from neighboring pixels at the red/blue pixels, and red/blue values must be interpolated at the green pixels. As with the panchromatic case, this solution is economical in respect to the amount of processing. Moreover, the resolution has improved by a factor of two (by the square root of two in each dimension), and the portion of the array values filled in through interpolation has been reduced from 2/3 to half.

The synthetic digital time delay integration techniques described herein yield high benefit when implemented using a conventional high-speed color camera array with a color filter array. In the Bayer pattern (the most commonly used color filter pattern used on digital cameras as noted above) the color filters are arranged in blocks of four, with one red, two green, and one blue filter in each block to return a three-color representation. (Other suitable filter patterns, by way of example, replace one of the green filters with an unfiltered pixel, or use four colors.) When the color image is reconstructed from the pixel values, an interpolation scheme is used to assign red, green, and blue values at each pixel. (Thus, two thirds of the information on every color picture captured with standard Bayer processing is synthesized up by interpolating between neighboring values.) By using digital time delay integration, a high resolution output grid can be designed to collect input from one or more pixels in each color, and a high-resolution image can be built using true color measurements at every pixel in the output image.

When one considers the potential resolution enhancement in terms of the red or blue color grids, the potential resolution enhancement in a color camera is four times the resolution enhancement for the panchromatic (black and white) camera. (This is a factor of two in each dimension. In most cases the largest practical resolution enhancement for a panchromatic imager is four where for a color imager it is sixteen.) For panchromatic focal planes where the active detector area fully fills each pixel, the maximum resolution improvement that can be gained through super-resolution processing with multiple images is a factor of two in each direction. Binning the images on a finer resolution output grid does not improve the effective resolution because the achievable resolution is also limited by the pixel size. However, with a color grid, only one pixel in four collects image information at red or blue, yielding an effective degradation in resolution by a factor of two in each direction. Super-resolution processing can recover this resolution loss, and still gain the factor of two improvement in each direction, for an effective resolution improvement by a factor of four in each direction, or a factor of sixteen overall.

To implement super-resolution TDI with a focal plane array (e.g., using a Bayer or similar color mask) each color is assigned a high-resolution output array. The three (or four) color arrays are populated in the same way as for the monochromatic array, except that the contributions are from only one color of pixel. It will take more input images to populate the high-resolution color output arrays than it takes for a monochromatic system because the pixels in each color can be viewed as a sparse array.

In an example embodiment, the imaging device 602 is part of a panoramic imaging system. An example of an application of this to an area where scanning imagers are not currently employed is for panoramic photography, wherein the camera is mounted on a rotating platform at an angle offset from the plane of rotation. The application implementation of the super-resolution TDI processing techniques described herein facilitates capturing an image with resolution well beyond what could be achieved by splicing together a number of still images from a camera with similar base resolution.

If the TDI super-resolution processing is to be applied to the output of a commercial camera, the measured values from each pixel will generally not be directly available because the Bayer pattern interpolation is usually internal to the camera. Even the so-called "raw" image is generally not raw in this sense. In this case, the image must first be de-convolved with the focal plane interpolation matrix to recover the measured values at each pixel. Accordingly, in an example embodiment, the processor is configured to de-convolve the output of the color camera with a preprocessing mask (e.g., a Bayer interpolation mask) in order to obtain pixel values representative of individual pixel measurements.

Example applications for the super-resolution digital time delay and integrate (TDI) image processing methodology described herein include: satellite push-broom imaging systems and satellite whisk-broom imaging systems of the type where CCD TDI imagers have traditionally been employed; camera systems to image moving components on high-speed assembly lines (e.g., quality assurance monitoring on an electronic component pick and place system); and cameras in high-speed document sorting systems (e.g., high-speed imagers used to read mail addresses on letters in a mail sorter or to read bank information from checks).

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. An imaging system comprising:
   an imaging device configured to capture a sequence of input images of a scene as a field of regard of the imaging device changes in position in relation to the scene pursuant to an imaging geometry; and
   a processor configured to utilize the imaging geometry to determine a sub-pixel component of frame-to-frame image motion and to use the sub-pixel component to construct a high-resolution output image from the input images integrating contributions to each output pixel of the output image in the pixel.

2. The imaging system of claim 1, wherein the imaging device is a sensor that is responsive to electromagnetic radiation in the visible, infrared, millimeter wave, terahertz, ultraviolet, x-ray, or gamma ray region of the spectrum.

3. The imaging system of claim 2, wherein the sensor is a staring array imager.

4. The imaging system of claim 2, wherein the sensor includes a focal plane array (FPA).

5. The imaging system of claim 2, wherein the sensor includes a charge-coupled device (CCD) array.

6. The imaging system of claim 2, wherein the sensor is an active-pixel imager.

7. The imaging system of claim 2, wherein the sensor includes a Complementary Metal-Oxide-Semiconductor (CMOS) imaging array.

8. The imaging system of claim 1, wherein the imaging geometry provides that the scene is rotated in relation to the field of regard.

9. The imaging system of claim 1, wherein the imaging geometry provides that the scene is rotated in relation to the field of regard at an angle between 0° and 90°.

10. The imaging system of claim 1, wherein the imaging geometry provides that the scene is rotated in relation to the field of regard at an angle of approximately 45°.

11. The imaging system of claim 1, wherein the imaging geometry provides that the scene is repositioned along an in-scan direction of the imaging device.

12. The imaging system of claim 1, wherein the imaging geometry provides that the scene is repositioned at approximately one pixel per sub-frame along an in-scan direction of the imaging device.

13. The imaging system of claim 1, wherein the imaging geometry provides that the scene is repositioned along a cross-scan direction of the imaging device.

14. The imaging system of claim 1, wherein the imaging geometry provides that the scene is repositioned at a fraction of a pixel per sub-frame along a cross-scan direction of the imaging device.

15. The imaging system of claim 1, wherein the imaging geometry provides that the scene is repositioned along both an in-scan direction and a cross-scan direction of the imaging device.

16. The imaging system of claim 1, wherein the imaging geometry provides that the scene is repositioned at a fraction of a pixel per sub-frame along both an in-scan direction and a cross-scan direction of the imaging device.

17. The imaging system of claim 1, wherein the imaging geometry provides that the scene is repositioned at approximately one pixel in the in-scan direction and a fraction of a pixel per sub-frame along a cross-scan direction of the imaging device.

18. The imaging system of claim 1, wherein the imaging geometry provides that the scene is repositioned at approximately 0.707 pixel in both the in-scan and cross-scan directions on the focal plane, for translation in the diagonal direction of approximately one-half pixel in both the in-scan and cross-scan direction each frame.

19. The imaging system of claim 1, wherein the imaging geometry is determined in advance to ensure optimum sub-pixel spacing of sub-frames for a super-resolution image reconstruction process implemented by the processor.

20. The imaging system of claim 1, wherein the processor is configured to implement an image correlation technique to determine a geometric relationship between pixel locations in the sequence of input images and pixels of the high-resolution output image.

21. The imaging system of claim 1, wherein the processor is configured to implement a registration estimation technique to determine a geometric relationship between pixel locations in the sequence of input images and pixels of the high-resolution output image.

22. The imaging system of claim 1, wherein the processor is configured to estimate noise in sub-frame to sub-frame motion counter the noise using a detection and estimation technique.

23. The imaging system of claim 22, wherein the detection and estimation technique utilizes a Kalman filter to track image motion.

24. The imaging system of claim 1, wherein the processor is configured to reconstruct the high-resolution output image from the input images during post-processing.

25. The imaging system of claim 1, wherein the processor is configured to project values measured at an image grid of the imaging device onto a high-resolution output grid.

26. The imaging system of claim 1, wherein the processor is configured to construct the high-resolution output image by binning values measured at an image grid of the imaging device.

27. The imaging system of claim 1, wherein the processor is configured to construct the high-resolution output image by averaging the valid contributions from each sub-image or image at every pixel of the high-resolution output image.

28. The imaging system of claim 1, wherein the processor is configured to construct the high-resolution output image by normalizing the valid contributions from each sub-image or image at every pixel of the high-resolution output image.

29. The imaging system of claim 1, wherein the processor is configured to construct the high-resolution output image by determining output pixels which are not supported by measurement and assigning values to these pixels by interpolating between neighboring values.

30. The imaging system of claim 1, wherein the processor is configured to process the high-resolution output image with a convolution filter.

31. The imaging system of claim 1, wherein the imaging device is a color camera with sensor input pixels and a filter array positioned in front of the sensor input pixels.

32. The imaging system of claim 31, wherein the imaging device is part of a panoramic imaging system.

33. The imaging system of claim 31, wherein the filter array has a spatially repeating filter pattern.

34. The imaging system of claim 31, wherein the filter array is a Bayer pattern color mask.

35. The imaging system of claim 31, wherein the filter array is a multispectral color mask.

36. The imaging system of claim 31, wherein the output of the color camera includes one value for each of the sensor input pixels for each filter mask type or filter color of the filter array.

37. The imaging system of claim 36, wherein the processor is configured to de-convolve the output of the color camera with a preprocessing mask in order to obtain pixel values representative of individual pixel measurements.

38. The imaging system of claim 37, wherein the preprocessing mask is a Bayer interpolation mask.

39. The imaging system of claim 1, wherein the imaging device includes an image sensor and a filter array including a polarization mask placed in front of the image sensor.

40. An imaging method comprising:
utilizing a camera to capture a sequence of input images of a scene in a camera grid such that the scene is rotated in relation to the camera grid and frame-to-frame motion is introduced along the sequence of images;
computing image motion with respect to a reference frame for a high-resolution output image; and
forming the high-resolution output image by processing the valid contributions from each sub-image or image of the camera grid at every pixel of the camera to provide output pixels of the output image, said processing including combining the valid contributions to each of the output pixels respectively in said pixel.

41. The imaging method of claim 40, wherein the scene is rotated in relation to the camera grid at an angle between 0° and 90°.

42. The imaging method of claim 40, wherein the scene is rotated in relation to the camera grid at an angle of approximately 45°.

43. The imaging method of claim 40, wherein the frame-to-frame motion provides that the scene is repositioned at approximately one pixel per sub-frame along an in-scan direction of the camera.

44. The imaging method of claim 40, wherein the frame-to-frame motion provides that the scene is repositioned at a fraction of a pixel per sub-frame along both the x and y directions on the camera focal plane.

45. The imaging method of claim 40, wherein the frame-to-frame motion is determined in advance to ensure optimum sub-pixel spacing of sub-frames for a super-resolution image reconstruction process.

46. The imaging method of claim 40, wherein the frame-to-frame motion is estimated using an image registration technique.

47. The imaging method of claim 40, wherein noise in sub-frame to sub-frame motion is estimated and countered using a detection and estimation technique.

48. The imaging method of claim 47, wherein the detection and estimation technique utilizes a Kalman filter to track image motion.

49. The imaging method of claim 40, wherein forming the high-resolution output image includes binning values measured at the focal plane of the camera.

50. The imaging method of claim 40, wherein processing the valid contributions comprises averaging the valid contributions from each sub-image or image from the camera at every pixel of the high-resolution output image.

51. The imaging method of claim 40, wherein processing the valid contributions comprises normalizing the valid contributions from each sub-image or image from the camera at every pixel of the high-resolution output image.

52. The imaging method of claim 40, wherein processing the valid contributions further comprises determining output pixels which are not supported by measurement and assigning values to these pixels by interpolating between neighboring values.

53. The imaging method of claim 40, wherein the method further comprises:
processing the high-resolution output image with a convolution filter.

* * * * *